Feb. 10, 1959

W. S. BOWEN 2,872,915

SOLAR ENERGY APPARATUS

Filed Feb. 2, 1956

INVENTOR.
WILLIAM SPENCER BOWEN
BY
Campbell, Brumbaugh, Free+Graves
his ATTORNEYS Feb. 10, 1959   W. S. BOWEN   2,872,915
SOLAR ENERGY APPARATUS
Filed Feb. 2, 1956
3 Sheets-Sheet 3

INVENTOR.
WILLIAM SPENCER BOWEN
BY
his   ATTORNEYS

United States Patent Office 2,872,915
Patented Feb. 10, 1959

2,872,915

SOLAR ENERGY APPARATUS

William Spencer Bowen, Westfield, N. J.

Application February 2, 1956, Serial No. 563,099

3 Claims. (Cl. 126—271)

This invention relates to an improved apparatus for collecting and utilizing solar energy.

Solar energy collecting devices, including parabolic mirrors, are beset by a number of critical problems which have contributed to the inefficiency of prior solar energy conversion systems. Thus, while the difficulties regarding the collector and the concentration of the rays of the sun at a particular point have been overcome, the problems involved in retaining the collected energy as heat have become critical and have proved more difficult to solve. Attempts to prevent heat losses from these devices have included insulating the collector surfaces and covering its open end with a transparent material to reduce convection losses. These and other measures have been only partially successful, however.

A major cause of heat losses in parabolic mirror collectors resides in heat radiation from the point of concentration of the sun rays. In other words, since the sunlight is converted to heat at a fluid carrying tube, heat waves are radiated therefrom and reflected in the same manner as light waves. Those radiant heat waves which return and strike the parabolic mirror are reflected upward in parallel planes and lost. Those which initially travel away from the mirror are also wasted. Where a transparent covering is placed over the mirror opening to reduce convection losses, a small amount of radiant heat is reflected back but not properly focused to be of much heating volue. Therefore, most, if not all, of the radiant heat emitted from the heated tube is lost.

Another problem with these devices is that of increasing the efficiency of the heat removing means at the point of concentration of the sun's rays. A tube or pipe is generally provided about the principal focus of the parabolic mirror, a fluid being circulated through this pipe or tube to absorb the heat and remove it from the apparatus. In this regard, it is important that the heat be removed as quickly as possible so that heat losses, particularly those due to radiation, are minimized.

Accordingly, a primary object of the present invention is to provide solar energy collecting and utilizing apparatus of greatly improved efficiency.

Another object of the invention is to prevent to a great extent the usual losses of heat due to radiation in a parabolic mirror solar energy collector.

A further object of the invention is to provide more efficient means for removing heat from a solar energy collector.

These and other objects of the invention are accomplished by disposing a secondary transparent parabolic mirror as a cover over a primary reflecting mirror so that the axis of principal focus of the secondary transparent parabolic mirror coincides with that of the primary reflecting parabolic mirror. This arrangement increases the efficiency of a solar energy mechanism of the parabolic mirror type by greatly reducing radiation heat losses.

It has also been found that the efficiency of this type of apparatus is further improved by providing one or more helical vanes within the fluid circulating tube. These vanes increase the rate and efficiency with which the heat is removed from the tube by creating a centrifugal force and turbulence in the fluid stream. As a result, a greater proportion of the fluid sweeps the inner surface of the tube to provide a more efficient heat exchange relationship.

Further, a greater improvement in the efficiency of the fluid circulating tube is obtained by providing fins or annular rings around the tube. The fins aid in absorbing the energy received from the light rays and also add structural strength to the tube. The latter advantage allows the fabrication of a thin-walled tube, with the result that the path of travel for the heat from the point of contact of the sun's rays to the circulating fluid within the tube is reduced. Structural strength is also an important advantage where the circulating fluid is under pressure.

These and further advantages of the invention will be more readily understood when the following description is read in connection with the accompanying drawings, in which:

Figure 4 is a transverse section of Figure 3 taken along the view line 4—4 looking in the direction of the arrows.

Figure 1:
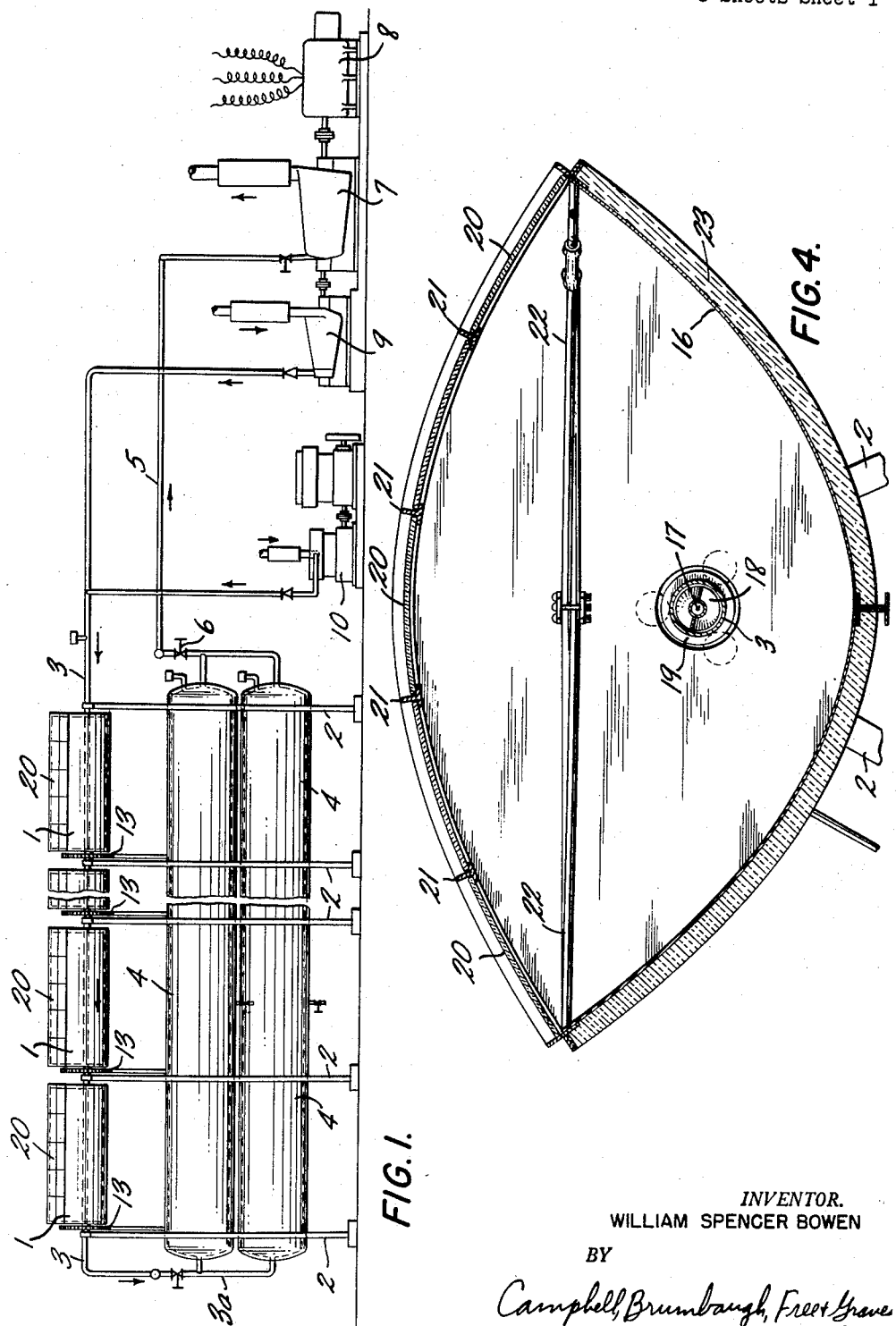
Figure 1 is an elevation, partially in schematic form, of a typical system embodying the solar energy mechanism of the present invention.

Referring to the embodiment of the invention shown in the drawings and especially to Figure 1, a series of solar energy collectors 1, each including a pair of parabolic mirrors described in detail hereinafter, are rotatably mounted on support frames 2. A tube 3 extends through each pair of mirrors and is positioned therein in a manner to be explained below. The tube 3 is provided with an extension 3a leading to storage tanks 4 mounted in any suitable manner (not shown) within the frames 2. Leading from the storage tanks 4 is another conduit 5, controlled by a valve 6, which is connected to a turbine 7 driving a generator 8 and a compressor 9. An auxiliary air compressor 10 may be used during the initial stages of operation of the solar energy collecting mechanism.

Figure 2:
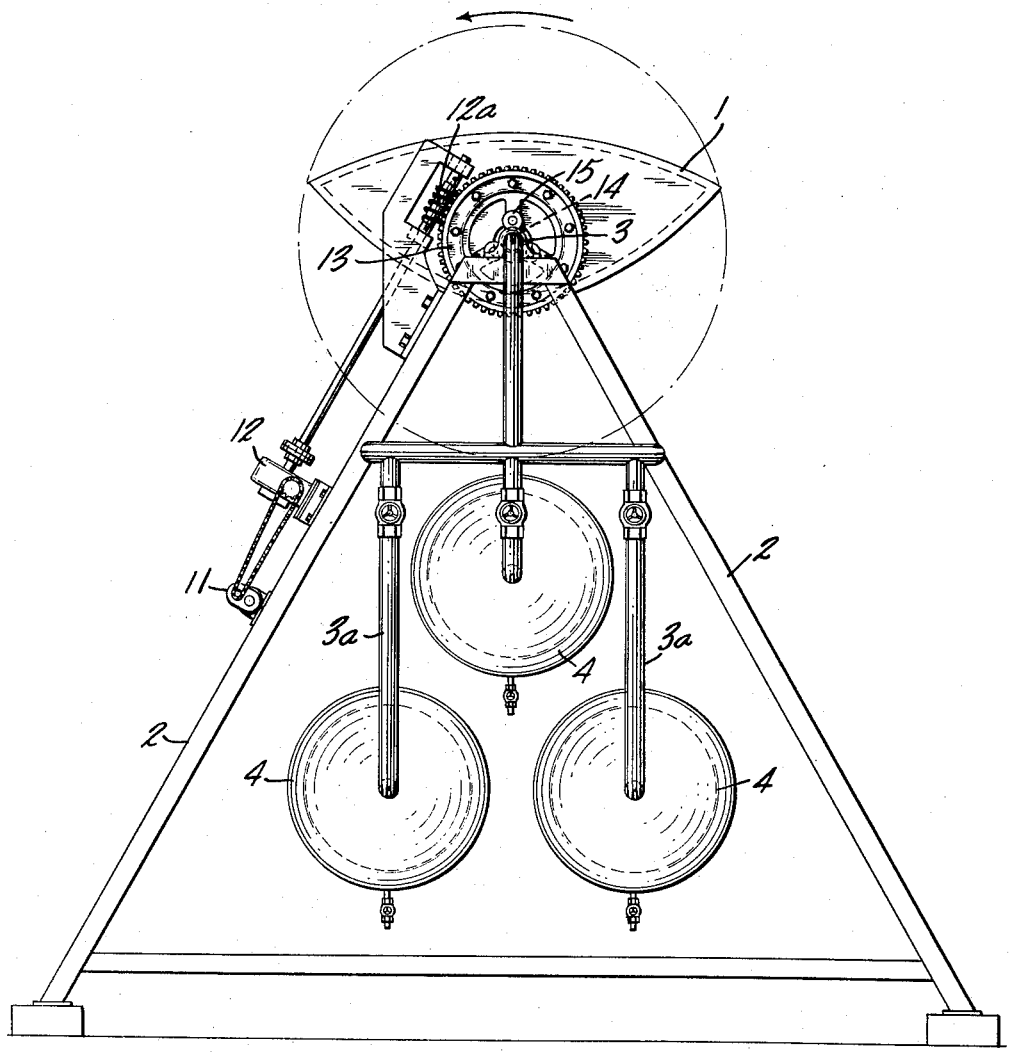
Figure 2 is an end elevation of the solar energy mechanism of Figure 1.

The drive elements rotating the collectors 1 are best shown in Figure 2. A motor 11 drives a speed reducer 12 coupled by a worm gear 12a to a large gear drum 13 which is in turn fixed to the end of each of the collectors 1. Of course, the collectors 1 may be appropriately joined and rotated by a single driving mechanism. Each of the driving mechanisms is timed so that the mirrors will make one complete revolution every twenty-four hours.

Figure 3:
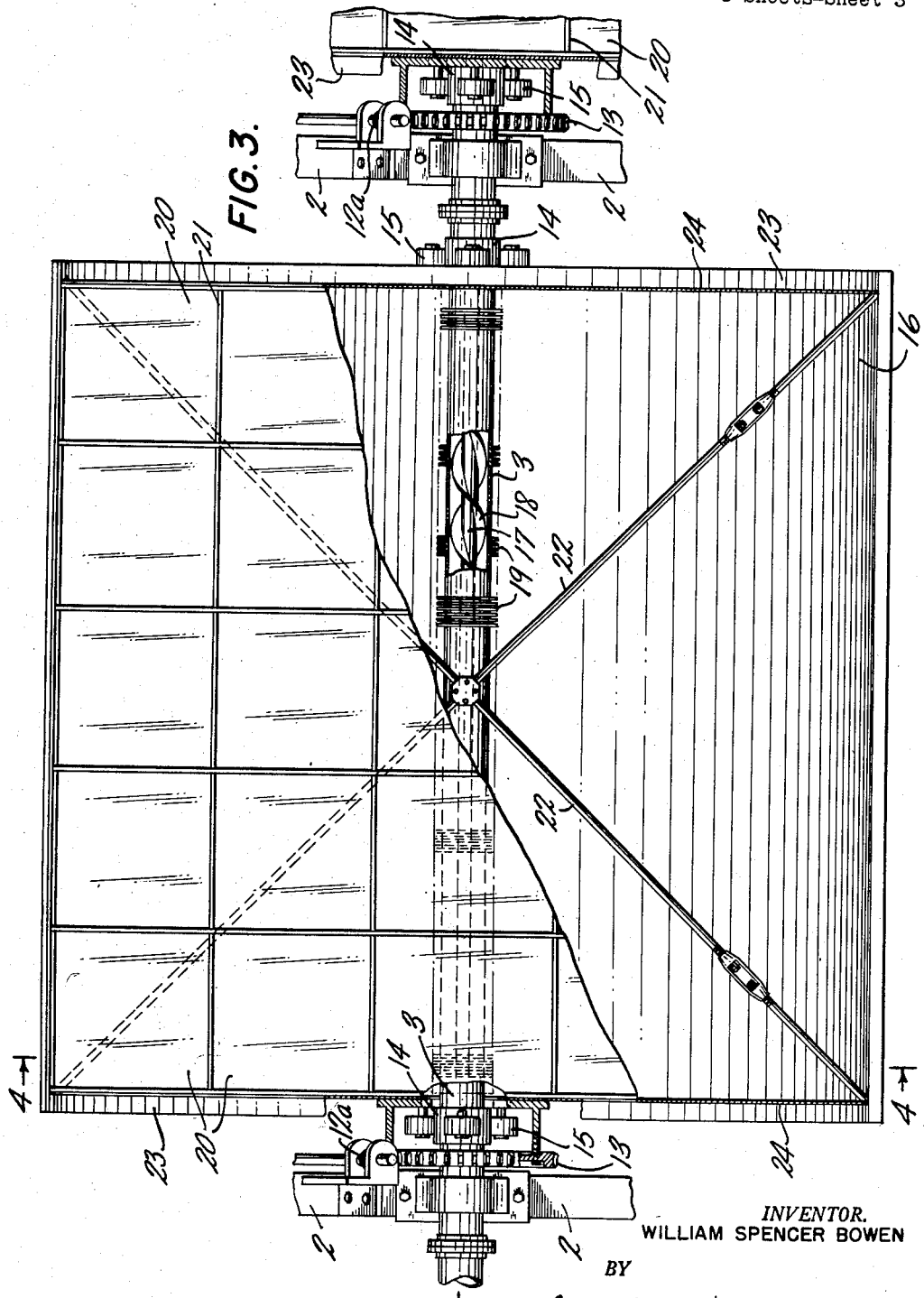
Figure 3 is a plan view of a solar energy collector constructed in accordance with the present invention.

One of the solar energy collectors 1, shown in detail in Figures 3 and 4, is rotatably mounted on the tube 3 by means of an annular surface 14 which supports roller bearings 15 carried thereby. Thus, the tube 3 serves as both a shaft for the rotation of the solar energy collecting device 1 and as a fluid conduit for the passage of a heat transfer fluid. Preferably, the tube 3 is formed of a highly heat conductive metal with a black surface. However, it may be desirable to cause photo-chemical changes within the fluid and in this event, the tube 3 may be made of a transparent material such as "Lucite" or glass so that light waves, particularly the short wave lengths, may penetrate it.

The collector 1 comprises a highly polished primary parabolic semicylindrical reflector or mirror 16 which has an axis of principal focus at line 17. The primary reflector 16 may be formed, for example, of highly polished copper clad steel, and serves to collect all primary plane waves or parallel rays from the sun and converge them on the tube 3 which is positioned coaxially with the axis of principal focus 17. A double helical guide vane 18 positioned within the tube 3 assists is mixing the fluid to provide for efficient heat transfer. In addition, the exterior of the tube 3 is formed with fins 19 which greatly improve its heat absorbing properties. The converged rays heat the tube 3 and the fluid circulating therethrough which flows from the collector 1 through the pipe section 3a into the storage tanks 4.

To complete the solar energy collector 1, a secondary transport parabolic mirror 20 comprising a series of panes of glass, sheets of methyl methacrylate polymer such as "Lucite," or similar transparent material is arranged in the form of a parabola having its axis of principal focus at line 17 supported by an appropriate frame 21. The sheets or panes are preferably curved to conform to the parabola, although they may be flat, and fitted into a parabolic frame 21. The collector 1 is strengthened by bracing it with crisscrossed tie rods and turn buckles 22. Suitable insulation material 23 may be disposed on the primary mirror 16 and on side plates 24 to further reduce heat losses.

The transparent mirror 20 may in addition be formed of well-known one-way light transmission elements. Examples of these include half-silvered or partially silvered glass or transparent plastic mirrors which have one surface partially covered with finely divided silver or other suitable metallic film. These elements transmit light received from the sun but reflect a considerable amount of the light and radiant heat waves striking the under-surface of the mirror.

In place of metal films, more transparent materials such as zinc sulfate and titanium dioxide, when applied to glass in thin, discontinuous coatings, will allow passage of up to 98% of the sunlight, but will reflect on the order of 20 to 30% of light rays and radiant heat waves from the interior surface, for example.

The transmission efficiency of the transparent mirror is further increased by reducing the reflectivity of the exterior surface of the transparent element. Considerable reduction in reflectivity is obtained, for example, by treating the outer surface with a 1% solution of acid sodium phosphate for eighteen hours as 80° C. Solutions of copper sulfate (2%) and phosphoric acid (1%) may also be employed according to well known procedures with similar reduction in reflectivity.

In a typical operation of the above described embodiment of the invention, the principal axis 17 is disposed in a north and south direction with the solar energy collectors 1 preferably being at the south end. The rotatable solar energy collectors 1 are then revolved from east to west following the sun in its course. If greater efficiency is desired, the north end of the system may be suitably raised to place the solar energy collectors 1 in a plane perpendicular to the sun's rays.

The parallel rays of the sun pass through the transparent secondary reflector 20 and are focused by the parabolic mirror 16 on the centrally located tube 3 which may be blackened to promote absorpton of the heat energy. Absorption of energy is also promoted by the fins 19. Since the tube 2 attains a high temperature, heat energy is radiated therefrom in all directions. The heat waves impinging on the primary reflector 16 are reflected in parallel planes toward the secondary parabolic reflector 20. Therefore, a substantial portion of them will be returned to the tube 3. In addition, those radiated heat waves which strike the secondary reflector 20 are reflected in parallel planes to the primary reflector 16 which focuses them on the tube 3. In view of the foregoing, it will be apparent that each of the collectors 1 acts similarly to a "black body" since it radiates outwardly only a very small proportion of received solar energy.

The fins or annular rings 19 aid in trapping the sunlight and in converting it into heat. Light rays falling on the tube 3 at an angle other than 90° are reflected from a fin surface to an adjacent fin surface, losing energy at each contact with a ring. The fins in turn conduct the heat to the tube 3. As aforementioned, the fins also provide additional structural strength to the tube 3, which is particularly desirable where a thin tube is employed and where the fluid is under pressure.

A fluid, for example air, passing through the tube 3 efficiently picks up heat energy since the vanes 18 sweep it around the tube interior. Therefore, when the air discharges from the solar energy collector 1 into the storage tanks 4, is may be employed in operating the turbine 7.

More particularly, the operating cycle of the system is initiated with the diesel motor driven air compressor 10 delivering air at about 100 p. s. i. through tube 3. Once the apparatus is in operation, the valve 6 is opened to supply heated air to the turbine 7 which, in addition to driving the generator 8, operates the compressor 9. At this time, the diesel compressor 10 can be shut down since the compressor 9 takes over its function. The heated compressed air collected in the storage tanks may be used immediately to produce electricity by operating the turbine-generator combination 7, 8 or, if desired, may be stored for future use.

The exemplary system has been described with particular reference to the use of compressed air as the heat absorbing and exchange fluid. Other fluids such as water are better conductors of heat and may be used where its supply is plentiful. However, the most favorable weather conditions for the operation of solar energy systems are generally found in arid regions and for this reason, air must, of necessity, be utilized in such syscms.

It will be understood that the above-described embodiment of the invention is illustrative only and modifications will occur to those skilled in the art. Therefore, the invention is not to be limited to the specific apparatus disclosed herein but is to be defined by the appended claims.

I claim:

1. In apparatus for collecting solar energy, a primary semicylindrical parabolic mirror, a secondary transparent semicylindrical parabolic partial mirror forming a closure over and having the same axis of principal focus as the primary mirror, a heat receiving tube positioned coaxially with the common axis of principal focus, a portion of the heat radiated from the lower half of the heat receiving tube being reflected by the primary mirror to the secondary mirror and reflected therefrom to the heat receiving tube, and a portion of the heat radiated from the upper half of the heat receiving tube being reflected by the secondary mirror to the primary mirror and reflected therefrom to the heat receiving tube.

2. In apparatus for collecting solar energy, a primary semicylindrical parabolic mirror arranged to be concave relative to the sun, a secondary transparent semicylindrical parabolic partial mirror arranged to be convex relative to the sun while forming a closure over and having the same axis of principal focus as the primary mirror, a heat receiving tube positioned coaxially with the common axis of principal focus, a double helical guide vane positioned within the heat receiving tube, a portion of the heat radiated from the lower half of the heat receiving tube being reflected by the primary mirror to the secondary mirror and reflected therefrom to the heat receiving tube, and a portion of the heat radiated from the upper half of the heat receiving tube being reflected by the secondary mirror to the primary mirror and reflected therefrom to the heat receiving tube.

3. In apparatus for collecting solar energy, a primary semicylindrical parabolic mirror arranged to be concave relative to the sun, a secondary transparent semicylindrical parabolic partial mirror arranged to be convex relative to the sun while forming a closure over and having the same axis of principal focus as the primary mirror, a heat receiving tube positioned coaxially with the common axis of principal focus, the secondary transparent semicylindrical parabolic mirror being formed of a one-way light transmission substance arranged to transmit a greater amount of light to the interior of the apparatus, a portion of the heat radiated from the lower half of the heat receiving tube being reflected by the primary mirror to the secondary mirror and reflected therefrom to the heat receiving tube, and a portion of the heat radiated from the upper half of the heat receiving tube being reflected by the secondary mirror to the primary mirror and reflected therefrom to the heat receiving tube.

References Cited in the file of this patent

UNITED STATES PATENTS

| Number | Name | Date |
|---|---|---|
| 748,696 | Browning | Jan. 5, 1904 |
| 820,127 | Pope | May 8, 1906 |
| 1,024,436 | Cortault | Apr. 23, 1912 |
| 1,457,565 | Warrick | June 5, 1923 |
| 1,683,266 | Shipman | Sept. 4, 1928 |
| 1,707,812 | Lynch | Apr. 2, 1929 |
| 1,833,876 | McGrath | Nov. 24, 1931 |
| 1,880,938 | Emmet | Oct. 4, 1932 |
| 1,989,999 | Niederle | Feb. 5, 1935 |
| 2,068,955 | Kritzer | Jan. 26, 1937 |
| 2,156,352 | Peterson | May 2, 1939 |
| 2,182,222 | Courtis et al. | Dec. 5, 1939 |
| 2,460,482 | Abbot | Feb. 1, 1949 |
| 2,467,885 | Freund | Apr. 19, 1949 |
| 2,575,478 | Wilson | Nov. 20, 1951 |